US011569981B1

(12) United States Patent
Mishra

(10) Patent No.: US 11,569,981 B1
(45) Date of Patent: Jan. 31, 2023

(54) BLOCKCHAIN NETWORK BASED ON MACHINE LEARNING-BASED PROOF OF WORK

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1192 days.

(21) Appl. No.: 16/114,667

(22) Filed: Aug. 28, 2018

(51) Int. Cl.
*G06N 20/00* (2019.01)
*H04L 9/06* (2006.01)
*G06K 9/62* (2022.01)
*G06N 3/00* (2006.01)
*H04L 9/00* (2022.01)
*G06F 16/23* (2019.01)
*G06F 21/60* (2013.01)

(52) U.S. Cl.
CPC .......... *H04L 9/0637* (2013.01); *G06K 9/6256* (2013.01); *G06N 3/002* (2013.01); *G06N 20/00* (2019.01); *H04L 9/0643* (2013.01); *G06F 16/2365* (2019.01); *G06F 21/60* (2013.01); *H04L 9/50* (2022.05)

(58) Field of Classification Search
CPC ....... G06N 3/00–126; G06N 5/00–048; G06N 7/00–08; G06N 20/00–20; G06N 3/002; G06F 16/23–2393; G06F 21/60–645; G06F 16/2365; H04L 9/06–0637; H04L 9/50; H04L 9/0643; G06K 9/6256
See application file for complete search history.

(56) References Cited

U.S. PATENT DOCUMENTS 8,762,299 B1 * 6/2014 Breckenridge ...... G06K 9/6227
706/12
9,342,798 B2 * 5/2016 Breckenridge ......... H04L 67/02
(Continued)

OTHER PUBLICATIONS

Kuo, Tsung-Ting, and Lucila Ohno-Machado. "Modelchain: Decentralized privacy-preserving healthcare predictive modeling framework on private blockchain networks." arXiv preprint arXiv:1802.01746 (2018). (Year: 2018).*

(Continued)

*Primary Examiner* — Mohamed A. Wasel
(74) *Attorney, Agent, or Firm* — Knobbe, Martens, Olson & Bear, LLP

(57) ABSTRACT

Systems and techniques are disclosed for a blockchain network based on machine learning-based proof of work. One of the methods includes accessing a blockchain associated with a blockchain network, and obtaining a first error value specified in a block of the blockchain, the first error value being associated with a machine learning model identified in the block, and the blockchain recording machine learning models. A new machine learning model associated with a second error value is determined, with the second error value being less than the first error value. A block proposal identifying the new machine learning model is generated, the block proposal specifying the first error value. Transmission of the block proposal to other entities is caused. In response to greater than a threshold percentage of the entities approving the block proposal, inclusion of the block proposal in the blockchain is caused.

19 Claims, 9 Drawing Sheets

(56) References Cited

U.S. PATENT DOCUMENTS

| | | | |
|---|---|---|---|
| 10,014,076 B1* | 7/2018 | LaBorde | G06N 3/04 |
| 11,042,809 B1* | 6/2021 | Breckenridge | H04L 67/02 |
| 11,121,859 B1* | 9/2021 | Mishra | H04L 9/3239 |
| 2007/0260563 A1* | 11/2007 | Fan | G06N 20/00 706/12 |
| 2012/0284212 A1* | 11/2012 | Lin | G06N 20/00 706/12 |
| 2013/0338803 A1* | 12/2013 | Maoz | A61B 5/30 700/93 |
| 2014/0222719 A1* | 8/2014 | Poulin | G16Z 99/00 706/46 |
| 2015/0170056 A1* | 6/2015 | Breckenridge | H04L 67/02 706/12 |
| 2015/0193697 A1* | 7/2015 | Vasseur | H04L 47/2466 706/12 |
| 2016/0019465 A1* | 1/2016 | Milton | G06N 7/005 706/52 |
| 2016/0224903 A1* | 8/2016 | Talathi | G06N 3/0454 |
| 2017/0006135 A1* | 1/2017 | Siebel | G06N 20/00 |
| 2018/0018582 A1* | 1/2018 | Unsal | G06N 3/126 |
| 2018/0060759 A1* | 3/2018 | Chu | G06N 20/00 |
| 2018/0285493 A1* | 10/2018 | Huang | G06F 30/20 |
| 2019/0042878 A1* | 2/2019 | Sheller | G06K 9/6269 |
| 2019/0042937 A1* | 2/2019 | Sheller | G06N 3/08 |
| 2019/0095805 A1* | 3/2019 | Tristan | G06N 5/045 |
| 2019/0236240 A1* | 8/2019 | Huang | G06N 20/00 |
| 2019/0236559 A1* | 8/2019 | Padmanabhan | G06Q 20/02 |
| 2019/0236598 A1* | 8/2019 | Padmanabhan | G06Q 20/0655 |
| 2019/0244138 A1* | 8/2019 | Bhowmick | H04L 67/10 |
| 2019/0279107 A1* | 9/2019 | Wang | G06N 20/00 |
| 2019/0303790 A1* | 10/2019 | Harvilla | G06Q 20/3567 |
| 2019/0332955 A1* | 10/2019 | Manamohan | G06K 9/6256 |
| 2019/0334716 A1* | 10/2019 | Kocsis | H04L 9/321 |
| 2019/0340586 A1* | 11/2019 | Sheng | G06Q 20/367 |
| 2019/0385092 A1* | 12/2019 | Benke | G06N 20/00 |
| 2019/0392457 A1* | 12/2019 | Kuntagod | G06Q 50/28 |
| 2020/0027010 A1* | 1/2020 | Lorenc | G06N 3/063 |
| 2020/0042857 A1* | 2/2020 | Fang | G06N 3/08 |
| 2020/0051260 A1* | 2/2020 | Shen | G06T 7/44 |
| 2020/0090063 A1* | 3/2020 | Reynolds | G06Q 10/0637 |
| 2020/0311248 A1* | 10/2020 | Dwarakanath | G06F 21/445 |
| 2020/0394470 A1* | 12/2020 | Ganapavarapu | G06N 20/00 |
| 2020/0394471 A1* | 12/2020 | Ganapavarapu | G06K 9/6264 |
| 2020/0394552 A1* | 12/2020 | Ganapavarapu | H04L 9/3247 |
| 2021/0035159 A1* | 2/2021 | Zhou | G06Q 30/0645 |
| 2021/0117381 A1* | 4/2021 | Irazabal | H04L 63/123 |
| 2021/0117404 A1* | 4/2021 | Irazabal | G06K 7/10722 |
| 2021/0158221 A1* | 5/2021 | Marlin | G06Q 30/0201 |
| 2021/0174958 A1* | 6/2021 | Drake | G16H 50/70 |
| 2021/0272017 A1* | 9/2021 | Singla | G06N 3/084 |
| 2021/0319353 A1* | 10/2021 | Sarpatwar | H04L 9/0852 |
| 2021/0327540 A1* | 10/2021 | Schobel | G16H 50/30 |
| 2022/0067752 A1* | 3/2022 | Fang | G06Q 20/3674 |

OTHER PUBLICATIONS

A. Charapko, A. Ailijiang and M. Demirbas, "Bridging Paxos and Blockchain Consensus," 2018 IEEE International Conference on Internet of Things (iThings) and IEEE Green Computing and Communications (GreenCom) and IEEE Cyber, Physical and Social Computing (CPSCom) and IEEE Smart Data (SmartData). (Year: 2018).*

* cited by examiner

BLOCKCHAIN NETWORK BASED ON MACHINE LEARNING-BASED PROOF OF WORK

BACKGROUND

Blockchain networks are commonly used to securely store information, and to ensure that the information can be exactly replicated across any entity which can access the blockchain network. These networks help guard against improper tampering by any of the storing entities. For example, each block in the blockchain may include a cryptographic hash of a prior block and/or the entire blockchain. Thus, certain blockchain networks may be utilized to record transactions. Example blockchain networks include Bitcoin and Ethereum. As new transactions are processed by the network, the transactions may thus be recorded in one or more blocks. To ensure that any entity (e.g., computer, server, mobile device) stores the same blocks—and therefore the same transactions—the entities may validate each new block proposed for inclusion in the blockchain. In this way, via validation the entities may arrive at a consensus regarding each new proposed block. Therefore, the validity of the transactions of the blockchain may be assured via the distribution of the blocks to each entity.

As is known, an example scheme to validate proposed blocks is via 'proof-of-work' (POW). In this example scheme, the entities running the blockchain network (e.g., processing transactions) may perform complex cryptographic functions. As an example, entities may perform particular cryptographic functions on, at least, transactions to be included in a proposed block. One example of such a cryptographic function is SHA-256. These entities may perform the cryptographic functions until stopping criteria is met. An example stopping criterion includes a result of the cryptographic function being lower than a threshold. Upon the stopping criteria being met, the proposed block may be validated and included in the blockchain. For example, the proposed block may include a cryptographic hash of a prior block and/or the entire blockchain. In this way, the blockchain may serve to record information in a distributed manner. However, the POW scheme described above does not cause useful work to be performed. Since these cryptographic functions are performed solely to identify the stopping criteria, they do not otherwise generate useful work (e.g., usable for other purposes). Thus, great processing and electricity power may be consumed in the search to solely identify the stopping criteria.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
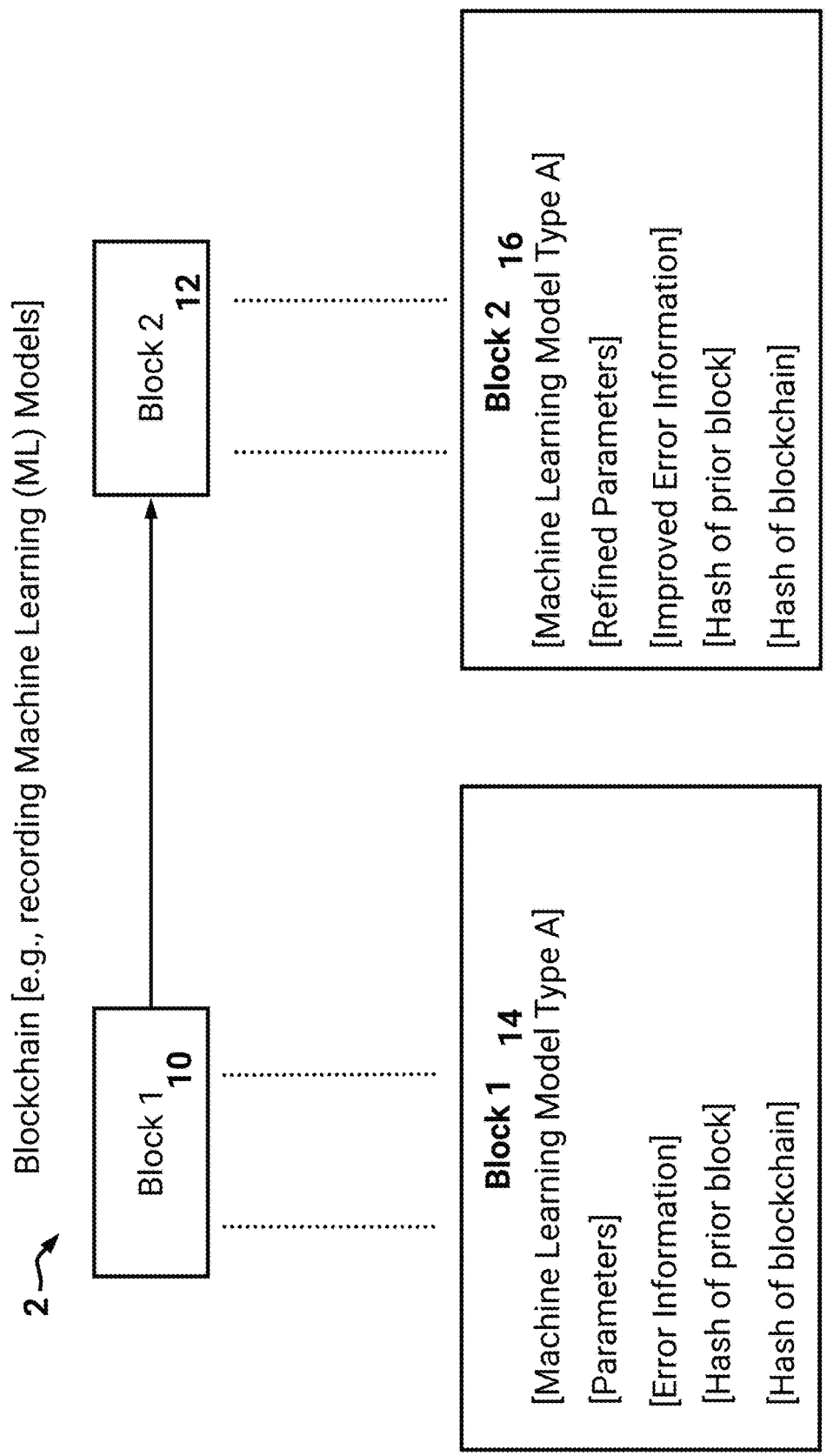
FIG. 1 illustrates a block diagram of a blockchain associated with an example blockchain network

Although particular embodiments are described herein, other embodiments, including embodiments that do not provide all of the benefits and features set forth herein, will be apparent to those of ordinary skill in the art.

Introduction

This specification describes improved techniques to exchange, and improve upon, machine learning models ('ML models'). It should be appreciated that programmers and programming teams can benefit greatly from being able to reuse machine learning models developed, trained and validated by other programmers or teams for solving similar problems. In addition to benefit afforded by reuse and exchange of ML models, the techniques described may ensure that a current state of the art ML model is easily identifiable. As will be described, a blockchain network may be leveraged to store ML models. As an example of the blockchain network storing an ML model, the blockchain network may store a type of the ML model and parameters associated with the ML model. It should be appreciated that a user of the blockchain network may obtain the type of an ML model and associated parameters, and generate the corresponding ML model for training. Example parameters may include hyperparameters (e.g., a parameter set, or held fixed, prior to a learning process) and/or model parameters (e.g., parameters derived, or learning, during training). For example, a type of ML model may include a neural network (e.g., recursive, convolutional, deep or feedforward), a support vector machine, a Bayesian network, decision tree, random forest, linear or logistic regression, multi arm bandit, and so on. Utilizing, for example, standardized machine learning libraries the user may cause the generation of the corresponding ML model. Optionally, the blockchain network may identify a library (e.g., open source library, such as MXNet) associated with a stored ML model. The user may then, as will be described, train the ML model utilizing training datasets.

In the blockchain network described above, each successive block in the blockchain can include an ML model which achieves superior performance than an ML model included in one or more prior blocks of the blockchain. Performance, as will be described, may be measured according to different error schemes. For example, error may be measured as generalization error which can indicate a degree to which an ML model can be utilized across multitudes of validation datasets. As an example, generalization error may measure how accurately a machine learning model is able to predict outcome values for previously unseen data.

It should be appreciated that different types of problems may benefit from use of ML models, however, determining a best ML model for a particular problem may present immense technical challenges. For example, an entity (e.g., a team or group within a corporation or other organization) may select a particular type of ML model. The entity may then determine parameters associated with the type of ML model. As an example with respect to a neural network, the entity can determine hyperparameters comprising a number of layers, a number of hidden units (e.g., a number of nodes in each layer), learning rate, loss functions (e.g., nonlinear loss functions), weight decay, activation sparsity, weight initialization, number of training iterations, and so on. The entity can then create an ML model trained on particular training datasets. The training ML model may comprise model parameters, such as weights associated with the neural network. Given processing and time constraints, the entity may determine an acceptable error threshold for their ML model and utilize the ML model which achieves this acceptable error threshold.

However, a different type of ML model may provide superior performance than the utilized ML model. Additionally, different parameters may provide superior performance. For example, different hyperparameters (e.g., a greater number of layers) or different model parameters (e.g., different weights) may enable reduced error. Furthermore, additional training datasets may enable the ML model to reduce its error. For example, the additional training datasets may include disparate types of information to which the entity may not have had access. Without a scheme to monitor all ML models which have been proposed, along with their respective accuracies, the entity may have no technique to continuously improve their ML model.

As an example of a type of problem, the entity may utilize an ML model to predict users who may perform a particular action. For example, the users may be users of an electronic store, and the particular action may be the users becoming digital subscribers of the electronic store. The entity may utilize training datasets that are specific to a first geographic region, for example the United States. Thus, the resulting trained ML model may learn to characterize particular information of users to predict whether they will perform the particular action. If the entity attempts to apply this ML model to a second geographic region, for example India, the particular information may not be available or may not result in accurate predictions. In this example, the entity may therefore be required to tweak, or otherwise adjust, the ML model for this second geographic region. For example, parameters of the ML model may need to be adjusted. As another example, a different type of ML model may provide better accuracy.

Commonly, the entity may generate an entirely new ML model. However, the techniques described herein can enable a great reduction in time associated with generating a new ML model. In the above-described example, the blockchain network described herein may store the ML model in a first block of the blockchain. For example, the ML model may be the ML model trained for the first geographic region and may be stored in an initial block of the blockchain. As described above, the first block may thus store, at least, a type of the ML model and parameters associated with the ML model. Different entities may access the blockchain, for example these entities may execute software which functions as nodes of the blockchain network. As will be described, the entities may perform a proof-of-work (POW) scheme to search for a subsequent block for inclusion in the blockchain. An example POW scheme can cause the entities to search for a more accurate ML model. For example, an entity may determine adjustments to the parameters of the ML model that cause the ML model to be more accurate (e.g., with respect to the second geographic region). As another example, an entity may determine that a different type of ML model results in greater accuracy. Upon determining a more accurate model, an entity may propose that the ML model be included in a subsequent block of the blockchain. As will be described, the accuracy of the proposed ML model may be validated by all other entities. Thus, the entities may cause the proposed block to be committed into the blockchain. In this way, the initial ML model created for the first geographic region may be rapidly adjusted to accurately work in the second geographic region.

As an example, a first entity may access the blockchain and obtain the ML model included in the first block. The first entity may search for a new ML model that provides better accuracy (e.g., predictions) than the ML model included in the block. For example, the new ML model may provide better accuracy with respect to previous validation datasets also tested with the obtained ML model. As another example, the first entity may have access to new validation datasets (e.g., generated by the first entity). Thus, the first entity may search for a new ML model that also provides better accuracy with respect to these new datasets. The new datasets may include millions, or more, training data samples, features, and so on. As will be described, the first entity may determine a generalized error associated with the new ML model. This generalized error may be based on an error associated with the new validation datasets and/or the previous validation datasets.

Thus, the generalization error associated with the new ML model may be compared to a generalization error associated with the ML model included in the first block. If the generalization error of the new ML model is less than the generalization error of the ML model in the first block, the first entity may propose that the new ML model be included in the blockchain. For example, the first entity may generate a block proposal which includes a type of the new ML model, parameters of the new ML model, error information (e.g., generalization error), and so on. This block proposal may then be broadcast by the first entity to the other entities over the blockchain network. For example, the first entity may transmit the block proposal to one or more peers (e.g., via TCP). These peers may then optionally continue transmitting the block proposal until all entities have received the proposal.

As described above, the block proposal may then be analyzed by the remaining entities. Optionally, receiving the block proposal may trigger software executing on systems associated with the remaining entities to validate the block proposal. Example validation may include confirming the generalization error associated with the new ML model. Since validation may require the remaining entities to have access to the new datasets utilized by the first entity, the first entity may enable access to these new datasets. As an example, the first entity may make the new datasets accessible to the remaining entities over a network (e.g., the internet). As another example, the first entity may store the new datasets in a content-addressable file system. For example, the interplanetary file system (IPFS) may be utilized. In this example, the new datasets may be associated with unique identifiers (e.g., cryptographic hash values). The remaining entities may receive these unique identifiers and utilize the content-addressable file system to retrieve the new datasets. Optionally, the block proposal may include the unique identifiers. In this way, the remaining entities may automatically trigger validation of the generalization error. The entities may then determine whether the block proposal is to be included in the blockchain. For example, the entities may commit the block proposal based on validating the generalization error and confirming the ML model improves accuracy.

In this way, the POW scheme described herein may enable blockchains to generate useful information. Thus, the technical underpinnings of blockchains may be improved. It should be appreciated that other blockchain networks, such as bitcoin, cause entities to search for arbitrary stopping criteria. With respect to bitcoin, entities perform cryptographic hashes on information until a resulting value is below a threshold. Since finding the resulting value may take substantial amounts of time, the blocks in the bitcoin network are prohibitively difficult to tamper with. Additionally, verifying each block merely requires an entity to compute a cryptographic hash of the block. Thus, the transactions can be trusted to be accurate. Similarly, the example POW scheme described herein causes entities to consume processing power and time to search for improved ML models. Since finding an ML model may, as an example, take a substantial amount of time, tampering with the blocks may also be prohibitively difficult. Additionally, verifying each block can require an entity to validate that an included ML model results in a specified generalization error.

Thus, the POW scheme described herein substantially ensures that the committed blocks cannot be subsequently tampered with. Since the blocks cannot be tampered with, the information associated with each ML model may be subsequently trustable. For example, each ML model included in the blockchain may identify credit information (e.g., an entity who generated the ML model). If any ML model is utilized, the entity who generated the ML model may optionally receive a fee, or other credit, based on this credit information. Optionally, the entities may ensure that any proposed ML model does not carry out malicious activities (e.g., pilfering of application data, selectively execution on specific input data while leaving out others, exploiting system vulnerabilities, and so on). Therefore, end-consuming users may utilize the ML models without being concerned as to their safety.

The blockchain-based exchange described herein can also enable entities to easily monitor, and leverage, current progress of ML models with respect to particular problems. Since an entity may propose adjustments to parameters of an ML model, or propose a new type of ML model, the blockchain may record a current state of the art. In this way, entities may easily obtain an accurate ML model for any number of problems. Thus, if an entity needs to analyze video feeds to identify particular objects, the entity can obtain one or more ML models from the blockchain network. Similarly, if this entity improves upon the ML models then the entity can propose that the improved ML model be included in the blockchain. Optionally, the entities may create new blockchains directed to new problems. Optionally, the entities may fork an existing blockchain to create a blockchain directed to a different aspect of a problem. For example, a blockchain may include ML models specific to a first geographic region (e.g., as described above). In this example, the blockchain may be forked to create a different blockchain where new blocks improve upon the included ML models for a second geographic region. The flexibility afforded by the blockchain thus enables rapid improvements to identifying, and utilizing, ML models.

FIG. 1 illustrates a block diagram of a blockchain 2 associated with an example blockchain network. As illustrated, the blockchain 2 records information associated with machine learning (ML) models. For example, the blockchain 2 may record information related to a specific problem. Example problems may include natural language understanding or processing problems, computer vision problems, predicting user behavior, and so on. Users, for example entities as described herein, may subscribe to particular blockchains. For example, the users may execute software on their devices which is configured to obtain the blocks (e.g., blocks 10-12) of a blockchain (e.g., blockchain 2). The software may function as a node of the blockchain network or may cause committed blocks of the blockchain network to be downloaded. As another example, the users may utilize devices to access the blockchain over a network (e.g., the internet). In this example, a server may provide network access to the blocks 10-12 of the blockchain 2.

An example of the information included in each block is illustrated in portions 14-16. Block 1 is illustrated as including an ML model type (e.g., 'Type A'), parameters associated with the ML model, and error information. Block 1 may further include cryptographic information associated with the blockchain 2 (e.g., a hash of a prior block, a hash of the blockchain). Optionally, the blocks may include storage, memory, and/or processing constraints. For example, these constraints may indicate required, or suggested, storage, memory, and/or processing abilities of systems which will be implementing an ML model. Thus, the blockchain 2 may implement aspects of a Merkle tree. Similarly, Block 2 is illustrated as including an ML model type (e.g., 'Type A'), parameters associated with the ML model, and error information.

It should be appreciated that parameters may comprise hyperparameters and model parameters. Hyperparameters may, as described above, be held fixed during a training process. For example, hyperparameters may be parameters of an overall learning function, which can define how an ML model is structured. Model parameters may be learned during training, for example they may be fitted to the training data and optimized by minimizing a loss function. For example, in the case of a random forest, hyperparameters may define one or more of a number of decision trees (e.g., estimators) in the random forest, maximum allowable depth for each decision tree, minimum number of samples at the leaf node of a decision tree, and so on. Random forests may be ensembles of decision trees. The model parameters of a random forest may comprise one or more of the variables and thresholds utilized to split each node learned during a training process. For a prediction application, the model parameter values may be selected by optimization minimizing a measure of prediction error (e.g., substantially minimizing) Other error metrics may be utilized depending on specific application. For example, certain error metrics may include prediction accuracy, area under the receiver operating characteristic curve (AUC) for classification, Mean Absolute Error (MAE), Mean Absolute Percentage Error (MAPE), Mean Absolute Scaled Error (MASE), and Root Mean Squared Error (RMSE) for regression problems. Model parameters of random forests and other ML techniques may be optimized to minimize error metrics against one or more training data sets during a training process.

As described above, each successive block of the blockchain 2 may include an ML model with reduced error as compared to ML models included in prior blocks. The error information illustrated in Blocks 1-2 can be measured according to different schemes. An example scheme described herein can measure generalization error of an ML model. As described above, generalization error can measure how accurately an algorithm is able to predict outcome values for previously unseen data. For example, generalization error may be measured as a difference between expected and empirical error (e.g., a difference between error on a training set and error on an underlying joint probability distribution). Thus, generalization error may indicate an error of the ML model with respect to disparate validation datasets.

For example, each validation dataset may include information for an ML model to ingest along with correct outputs or labels for the ingested information. The error information may optionally indicate a percentage of incorrect outputs or labels. Optionally, the error information may be weighted. For example, the weighting may be based on the number of samples and associated with outputs or labels in the datasets. As another example, a first validation dataset may be associated with a first weight while a second validation dataset may be associated with a second weight. In this example, the first validation dataset may include information with less adherence to a particular problem the ML models are being trained to address. For example, the blockchain 2 may include ML models predicting user behavior in a particular geographic area. The first validation dataset may include user information which is not entirely specific to the particular geographic area. Similarly, the first validation dataset may include less detailed information as compared to the second validation dataset.

It should be appreciated that error minimized during a learning process may be referred to as training error, while error computed against an unseen, new data set, may be called generalization or testing error. During the training process, model parameters may be selected, or determined, to fit the training data as well as possible. For example, the model parameters may enable the training error to decrease. With respect to hyperparameters, the hyperparameters may constrain the size of a hypothesis space (e.g., for improved generalization). Adjusting hyperparameters may, in some examples, tend to increase training error such that generalization error may be improved. Because of this interplay, two different sets of data (e.g., training datasets and validation datasets) may be utilized to optimize model parameters and hyperparameters. For example, model parameters may be optimized on a training dataset and hyperparameters may be optimized on a validation dataset. Each entity associated with the blockchain 2 may have its own training datasets for determining the model parameters. As will be described, the entity may then publish validation datasets to enable other entities to check their choice of hyperparameters for proposed blocks. Generalization error may formalize a degree to which an ML model included in a proposed block is under-fitted or over-fitted.

Generalization error may utilize any of the same error metrics described above to determine error associated with unseen or new validation datasets. Example error metrics may include prediction accuracy, area under the receiver operating characteristic curve (AUC) for classification, Mean Absolute Error (MAE), Mean Absolute Percentage Error (MAPE), Mean Absolute Scaled Error (MASE), and Root Mean Squared Error (RMSE) for regression problems, and so on. An entity may utilize may utilize cross-validation to measure how well an ML model might generalize to new data. Example schemes to measure cross-validation may comprise k-fold and leave-one-out cross-validation.

For example, in k-fold cross validation, training datasets may be split into k equal-sized sets at random. In this example, hyperparameters may be chosen and an ML model may be trained on training data except the data included in each set. The ML model may then be tested on the left-out set, and its error may be computed (e.g., using any of the error metric mention earlier). The process may be repeated for different hyperparameters, and the ones that yield a lowest error (e.g., an average error metric computed over all k folds) may be selected. It should be appreciated that cross-validation may utilize the same training dataset to determine generalization error. However, utilizing the techniques described herein with respect to blockchain, entities can utilize one or more of the validation datasets provided by other entities to cross-validate their model. Additionally, entities can utilize using their training data (e.g., in its entirety) to minimize training error (e.g., substantially minimize). This may especially be significant in situations for which there is limited training data.

The error information included in Blocks 1-2 may therefore summarize error of the included ML models. While the description above focused on generalization error, it should be understood that additional schemes to measure error may be utilized. Example schemes may include R-squared, root mean squared error, accuracy, precision, recall, F score, confusion matrices, Cohen's kappa, Power's kappa, and so on. As will be described, the entities associated with the blockchain 2 may validate the error information. For example, when evaluating a proposed block, the entities may determine the generalization error of the included ML model. The entities may then validate whether their determined generalization error comports with the generalization error in the proposed block. Thus, the error information included in Blocks 1-2 may be agreed upon by the entities. In this way, the entities may agree upon the values of the error information and also schemes to determine the error information.

As will be described below, the entities associated with the blockchain 2 can determine new or updated ML models with reduced error (e.g., lower generalization error). These new or updated ML models may then be recorded in the blockchain. As illustrated in FIG. 1, Block 2 includes refined parameters as compared to the parameters in Block 1. Thus, an entity who generated the ML model in Block 2 determined updated parameters associated with the same ML model type as Block 1. The parameters of a ML model may be based on the type of the ML model. For example, with respect to neural networks the parameters may comprise hyperparameters indicating a number of layers, a type of each layer (e.g., pooling layer), a number of neurons, a type of neurons, connections between the neurons, and so on. The parameters may also comprise model parameter values, such as weights applied to particular features (e.g., connections between neurons), activation functions, and so on.

Since a trained ML model may be too large to store in a block, the block may instead include the type of ML model and the associated parameters. Thus, the ML model as included in a block may indicate information sufficient to enable generation of a trained ML model. It should be appreciated that ML models, for example templates of ML models, may be accessible via standard libraries. As an example, an entity may obtain code for a standardized neural network from an open source or closed source library. This code may be adjusted to reflect the parameters included in a block. With respect to the neural network, the entity may utilize the parameters to specify the number of layers, number of neurons, and so on that are to be utilized in the ML model. The entity may then train the ML model.

To train the ML model, the entity may access training datasets and cause the ML model to be trained on the training datasets. These training datasets may optionally be unique to the entity (e.g., created by, or otherwise accessible to, the entity). The training datasets may also be obtained from an entity which proposed that the ML model be included in the blockchain 2. In some embodiments, the entities associated with the blockchain 2 may maintain training datasets at a central server location. For example, FIG. 2B illustrates a central server (e.g., the validation dataset storage system 100) which may store training datasets. In some embodiments, a block included in the blockchain 2 may include information identifying locations at which training datasets may be obtained. For example, the block may include a network address associated with a training dataset. As another example, the block may include a hash associated with the training dataset. This hash may be utilized by a content-addressable file system (e.g., the interplanetary file system) to obtain the training dataset. In this way, the entity may obtain a trained ML model according to the information included in the block.

While the example of FIG. 1 illustrates Block 2 and Block 1 including ML models of a same type (e.g., 'Type A'), it should be understood that Block 2 may include a different type. As an example, a particular entity may have proposed that Block 2 be included in the blockchain 2. The particular entity, as will be described below with respect to FIGS. 2A-2C, may have performed a search for a new ML model. The search may cause the particular entity to search for an ML model with at least a threshold percentage better generalization error than the ML model included in Block 1. Thus, the particular entity may perform the search using one or more types of ML models. The particular entity may also perform the search via specifying ranges of hyperparameters associated with the types of ML models. The particularly entity may also perform the search via specifying the best-case end goal to outperform (e.g., minimum generalization error, accuracy, precision, and/or best performance metrics achieved up to that point). Optionally, the particular entity may analyze the model parameters associated with ML models included in the blockchain 2. The particular entity may use these model parameters as a starting point, and vary the model parameters optionally within one or more ranges. Based on the above-described search, the particular entity may determine a new ML model of a same type, or different type, as the ML model in Block 1. In this way, the ML models included in the blockchain 2 may vary in type and parameters. Thus, the blockchain may identify a current best ML model (e.g., an ML model with a lowest error, such as a lowest generalization error).

Figure 2A:
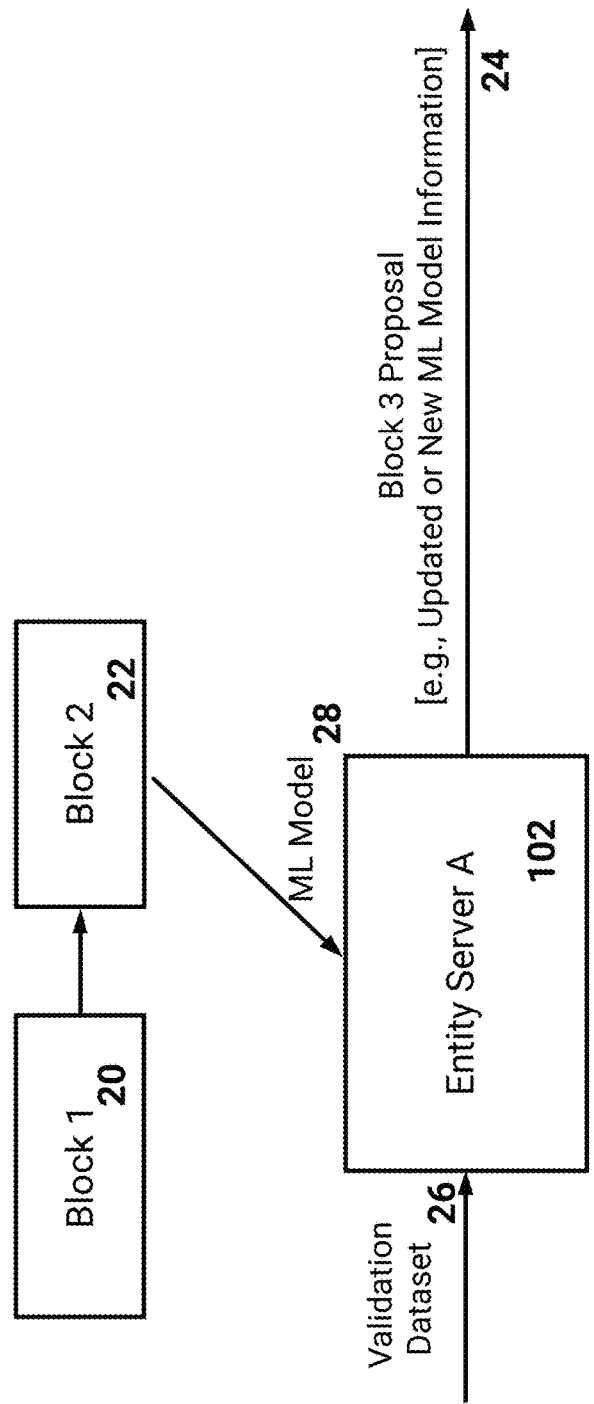
FIG. 2A illustrates a block diagram of an example entity server proposing a block for inclusion in a blockchain.
Figure 2B:
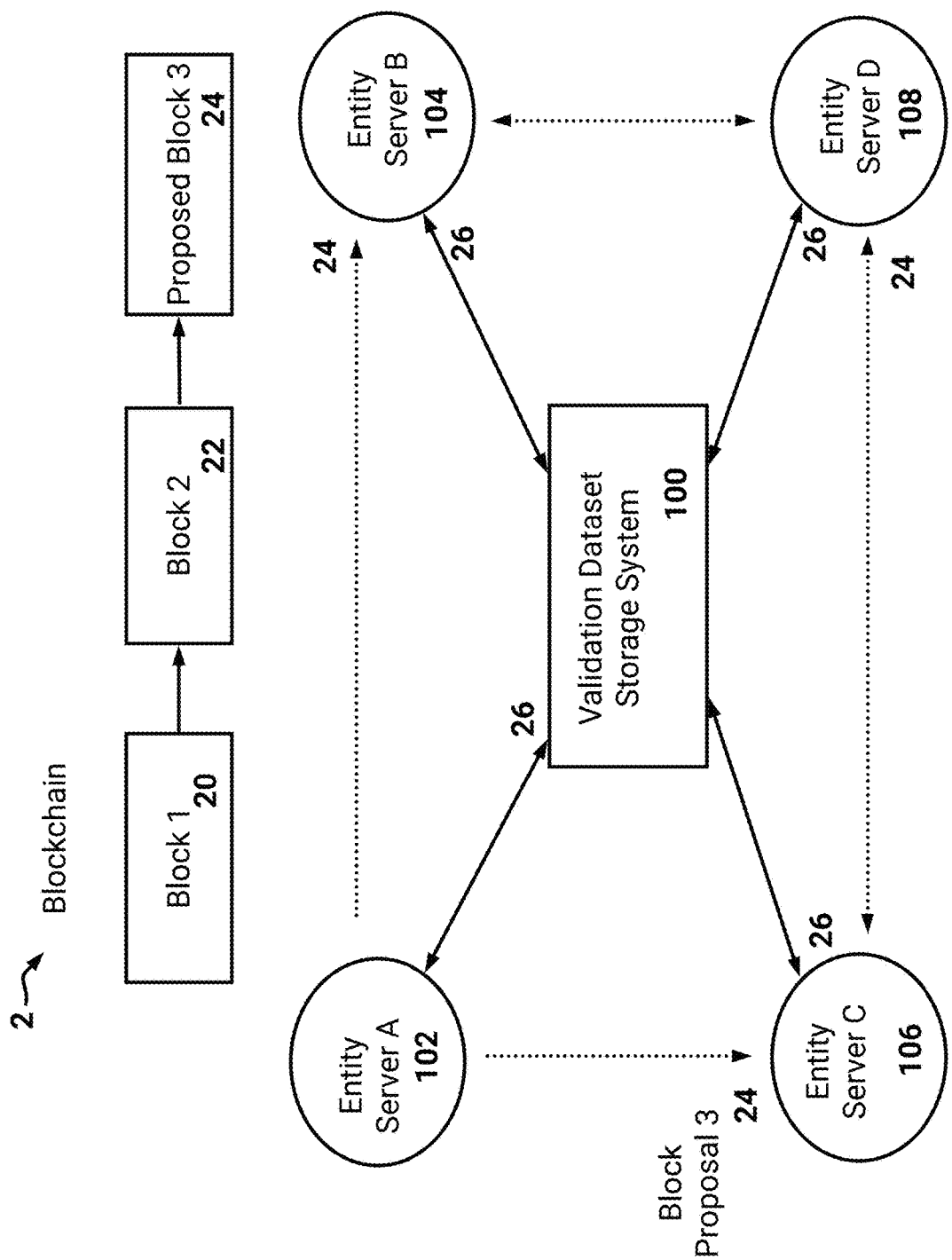
FIG. 2B illustrates a block diagram of a plurality of entity servers evaluating the block proposal.

FIG. 2A illustrates a block diagram of an example entity server 102 proposing a block 24 for inclusion in a blockchain 2. Entity server A 102 may be a system of one or more computers, one or more virtual machines executing on a system of one or more computers, and so on. Entity server A 102 may execute software configured to function as a node of a blockchain network associated with the blockchain 2. Thus, entity server A 102 may obtain blocks included in the blockchain 2, broadcast block proposals for evaluation by other entities, and so on. Additionally, entity server A 102 may execute software configured to automatically cause evaluation of block proposals generated by other entities. In this way, the techniques described herein may be, at least in part, automated.

The example blockchain 2 includes two blocks 20-22, Block 1 and Block 2. Block 2 represents a current block, and thus entity server A 102 may mine for a subsequent block to be included in the blockchain 2. In the example of FIG. 2A, entity server A 102 has obtained an ML model 28 included in Block 2. As described in FIG. 1, Block 2 may include an ML model 28 with a lowest error (e.g., generalization error). Additionally, the information included in Block 2 may, as described above, specify a generalization error associated with ML model 28. To mine another block, entity server A 102 may therefore search for a new ML model with a lower error than the specified generalization error associated with ML model 28. Examples of searching for a new ML model will be described in more detail below, for example with respect to FIGS. 3A-3B. Since searching for the new ML model consumes processing power and time, this searching scheme may, for example, serve as the proof-of-work (POW) technique for the blockchain 2.

Entity server A 102 is illustrated as receiving a validation dataset 26. The validation dataset 26 may be a new dataset, for example specific to entity server A 102 (e.g., owned and/or generated by entity server A 102). The validation dataset 26 may optionally be a validation dataset previously utilized to determine an error associated with an ML model included in the blockchain 2. The dataset 26 may include thousands, millions, and so on, of training data samples. To search for a new ML model, entity server A 102 can therefore search for an ML model with better generalization error for the validation dataset 26. Since this dataset 26 may be specific to entity server A 102, the ML model 28 included in Block 2 may not have analyzed, or been trained on, the dataset 26. Entity server A 102 may therefore search for a new ML model which provides better generalization across the datasets (e.g., including validation dataset 26).

To search for a new ML model, entity server A 102 may utilize a space of ML models along with termination criteria. The termination criteria may relate to an amount of time the searching is to occur, resources the server 102 can devote to the searching, and optionally a threshold percentage reduction in generalization error as compared to ML model 28. The space of ML models may be based on one or more of a type of ML models to consider, ranges of model parameters (e.g., hyperparameters), generalization error to outperform, and a range and estimates of model parameters values.

With respect to a type of ML models to consider, entity server A 102 may prefer types of models known to be applicable to a type of problem being addressed by the ML models included in the blockchain 2. For example, entity server A 102 can access information indicating types of models which provide good generalization error for the type of problem. Entity server A 102 can also analyze the types of ML models included in prior blocks of the blockchain 2. As an example, entity server A 102 may prefer considering types of models which are represented in the blockchain 2. Optionally, a user of entity server A 102 may select that a particular type of ML model be considered. Entity server A 102 may respond to user input, for example via a user interface, or the user may utilize a user device in communication with entity server A 102. Therefore, if the user determines that a particular type of ML model is to be searched then entity server A 102 may perform the search.

With respect to ranges of hyperparameters, entity server A 102 may constrain the ranges of parameters to be searched. An example range of parameters may include a maximum number of decision trees in an ensemble for a random forest; a maximum depth of a decision tree; a number of hidden units, activation functions, learning rate in a neural network; and so on. The ranges may therefore limit an extent to which entity server A 102 searches for a new ML model. In this way, entity server A 102 may search for new ML models with parameters within a threshold measure of the parameters of the ML model 28. Similar to the above, a user of entity server A 102 may specify parameters that are to be utilized. For example, the user may indicate a number of layers to be utilized in a neural network. As another example, the user may indicate a range of layers that are to be utilized or a range of neurons that are to be included in the neural network.

With respect to generalization error to outperform, entity server A 102 may set a threshold percentage reduction as compared to ML model 28. The threshold percentage reduction may be set by the blockchain network. For example, the threshold percentage may be set in software, executed by the entity server A 102, which is configured to function as a node of the blockchain network. The threshold percentage may optionally be based on the generalization error of ML model 28. For example, if the generalization error is below a threshold (e.g., below 2, 3, 5%) then entity server A 102 may search for a new generalization error that is close (e.g., within a first threshold percentage of) the generalization error. As another example, if the generalization error is above the first threshold, and below a second threshold (e.g., 10, 15, 17%), then entity server A 102 may search for a new generalization error that is substantially better than the generalization error. For example, within a second threshold percentage of the generalization error.

The threshold percentage may also be based on consent of the entities associated with the blockchain 2. For example, the entities may consent to a minimum threshold percentage reduction for a new ML model to be included in the blockchain 2. As an example, the threshold percentage may be 1, 3, or 7% better than the generalization error of ML model 28. Thus, if the generalization error of ML model 28 is 4%, then the minimum acceptable generalization error may be 3.96, 3.88, or 3.72%. The threshold percentage may be consented to via the entities broadcasting votes and negotiation the threshold. Additionally, the threshold may be determined (e.g., empirically determined) based on whether the entities consent to a new block proposal. For example, the entities may vote to reject a new block proposal based on the included generalization error being less than a threshold percentage better than a prior generalization error. In this way, entity server A 102 may learn the threshold percentage, and thus search for ML models which are at least the threshold percentage better than the generalization error of ML model 28.

With respect to a range and estimate of model parameters values, entity server A 102 may analyze the ML models included in the blockchain 2. Based on this analysis, entity server A 102 may prefer to initiate the search for a new ML model based on the model parameter values of prior ML models. For example, if the ML models of a particular type have utilized parameters within a threshold of each other, then entity server A 102 may prefer starting within this threshold also. For example, if the type of problem being addressed relates to identifying particular objects in images, entity server A 102 may search for a neural network model. In this example, entity server A 102 may identify the number of layers utilized in prior ML models. Entity server A 102 may initiate the search using a number of layers which has generally achieved a best generalization error.

With the space of ML models to search for set, entity server A 102 may then initiate the searching process. For example, entity server A 102 may select a type of ML model along with particular parameters. Entity server A 102 may then train a new ML model based on the selected type and parameters. As an example, server A 102 may access training datasets and train the ML model. A generalization error for this new ML model may then be determined based on one or more validation datasets. Example validation datasets may include the validation dataset 26 optionally along with validation datasets utilized by other entities associated with the blockchain 2. Entity server A 102 can compare the determined generalization error to the generalization error indicated in Block 2. If the determined generalization error is better than the error indicated in Block 2 (e.g., by the threshold percentage reduction described above, or better at all), then the server 102 may generate a block proposal 24 including the new ML model. However, if the determined generalization error is worse, or not better than the threshold percentage reduction, then the server 102 may select a new ML model from the space of ML models.

As illustrated, entity server A 102 has generated a block proposal 24 for evaluation by other entities. As will be described below, with respect to FIG. 2B, entity servers associated with the other entities may evaluate the block proposal 24. The entities may then cause the inclusion of the block proposal 24 into the blockchain 2.

The description above has focused on entity server A 102 searching for a new ML model according to a space of ML models. However, it should be understood that users associated with entity server A 102 may generate their own ML model. The users may cause entity server A 102 to propose that this generated ML model be included in the blockchain 2. For example, a research team may generate an ML model not according to the techniques described above. In this example, the research team may propose the ML model be included in the blockchain 2.

FIG. 2B illustrates a block diagram of a plurality of entity servers 102-108 evaluating the block proposal 24. As described in FIG. 2A, entity server A 102 generated a block proposal 24 for evaluation. The proposed block 24 may include a hash associated with the blockchain 2 and/or prior Block 2, a new ML model (e.g., a type of the model, parameters of the model), error information (e.g., generalization error), and so on. Entity server A 102 may broadcast the block proposal 24 to entity servers B-D 104-108. Optionally, entity server A 102 may route the block proposal 24 via one or more intermediary servers (e.g., the validation dataset storage system 100), or via direct connections to the entity servers 104-106.

The entity servers 104-108 may execute software which triggers the servers 104-108 to perform one or more actions based on receipt of the block proposal 24. The software may thus automate the evaluation process, and enable the entity servers 104-108 to analyze ML models without, or with limited, user actions. As an example, the entity servers 102-108 may obtain the information included in the block proposal 24. This information, as described above, can include information sufficient to enable generation of the ML model. The entity servers 102-108 may then access training datasets, and generate a trained ML model based on the obtained information. To evaluate the ML model, the entity servers 104-108 can each determine error information associated with the ML model. For example, the servers 104-108 can each determine a generalization error. Based on this determined generalization error, the servers 104-108 can each determine whether to commit the block proposal to the blockchain 2.

Since the validation dataset 26 utilized by entity server A 102 (e.g., to determine generalization error) may be a new dataset, entity server A 102 may make the validation dataset 26 available to the remaining entity servers 104-108. The entity servers 104-108 may utilize the validation dataset 26 when determining error information associated with the ML model included in block proposal 24. FIG. 2B illustrates an example system (e.g., the validation dataset storage system 100) configured to route the validation dataset 26 to the entity servers 104-108. The validation dataset storage system 100 may receive datasets utilized by different entities, and enable access to the datasets by other entities. For example, entity server A 102 may provide the validation dataset 26 to the validation dataset storage system 100 for storage. In this example, the remaining entity servers 104-108 may receive the validation dataset 26. As will be described below, the remaining entities 104-108 may validate that the ML model included in the block proposal 24 achieves the error specified in the proposal 24.

Optionally, the validation dataset storage system 100 may enforce access rights, or other permissions, with respect to the validation dataset 26. For example, the validation dataset storage system 100 may store information indicating which entity servers are associated with the blockchain 2. The information may be based on which entity servers execute software configured to function as a node of the blockchain 2. Optionally, a smart contract associated with the blockchain network may cause the validation dataset 26 to be routed to specific servers. For example, an oracle, or other trusted software, may execute on a system (e.g., the validation dataset storage system 100). The oracle may store information indicating network addresses, or other identifying information, associated with the entity servers 102-108. The smart contract may cause access to this information, and then cause routing of the validation dataset 26. In this way, the entity servers 102-108 may maintain a private blockchain. Additionally, sensitive information may be securely routed.

The block proposal 24 may further indicate locations at which the validation dataset 26 can be accessed. For example, a content-addressable file system may be relied upon to store datasets utilized either as training data or as validation data. As described above, the datasets may be referenced by a respective hash value (e.g., cryptographic hash value). The block proposal 24 may therefore include these hash values. Optionally, the block proposal 24 may include a hash value that is associated with a document. The document may indicate the training datasets and/or validation datasets utilized by entity server A 102. In this way, the remaining entity servers 104-108 may obtain the datasets. It should be understood that a content-addressable file system may securely store information amongst multitudes of servers functioning as nodes. Access to the stored information may be constrained, and all access attempts recorded. Additionally, any edits or changes made to the information may be disallowed and/or tracked. An example of a content-addressable file system is the interplanetary file system (IPFS). The entity servers 102-108 may optionally each execute software to function as nodes of the content-addressable file system. Thus, the datasets may be securely replicated and shared amongst the entities.

The entity servers 104-108 may therefore obtain the validation dataset 26 for use in determining error associated with the ML model. As described above, the entity servers 104-108 can each generate a trained ML model based on the information included in the block proposal 24. In some embodiments, a subset of the entity servers may train their own ML model and validate the error information. For example, a smart contract may cause selection (e.g., random selection) of a subset of the entity servers. In this way, a representative sample of the entity servers 102-108 may analyze the block proposal 24 without requiring all entity servers 102-108 to utilize processing power and compute time.

To train the ML model, the entity servers 104-108 may each access training datasets. For example, the entity servers 104-108 may each access the same training datasets (e.g., from the validation dataset storage system 100, or stored locally). Optionally, the entity servers 104-108 may utilize, at least in part, their own training datasets. For example, entity server 104 may obtain the information included in the proposed block 24. The entity server 104 may then obtain code (e.g., a template of an ML model), or an executable file (e.g., a binary file), and prepare the ML model according to the block proposal 24. Since the ML model is expected to be accurate with sufficient training data, the entity server 104 may train the ML model using an in-house generated or obtained training dataset. Optionally, the entity server 104 may utilize other training datasets (e.g., generated or obtained by other entities). Optionally, if an entity server utilizes its own training data, the other entity servers may request access to the training data. For example, if entity server B rejects the block proposal 24, the other entity servers A, C-D, may request the training datasets and/or validation datasets to confirm their accuracy (e.g., confirm that the ML model was trained properly).

The entity servers 104-108 may evaluate the block proposal 24 utilizing validation datasets. For example, the entity servers 104-108 may determine error associated with the validation dataset 26. The same validation datasets may optionally be utilized by each entity server. As described above, with respect to training datasets, the entity servers 104-108 may obtain the validation datasets via the system 100 or via a content-addressable file system. Optionally, the entity servers 104-108 may utilize validation datasets they have generated, or uniquely have access to. The determined error may be generalization error, and the entity servers 104-108 may determine generalization error according to any preferred scheme. The entity servers 104-108 may also consent to a specific scheme to determine generalization error.

Figure 2C:
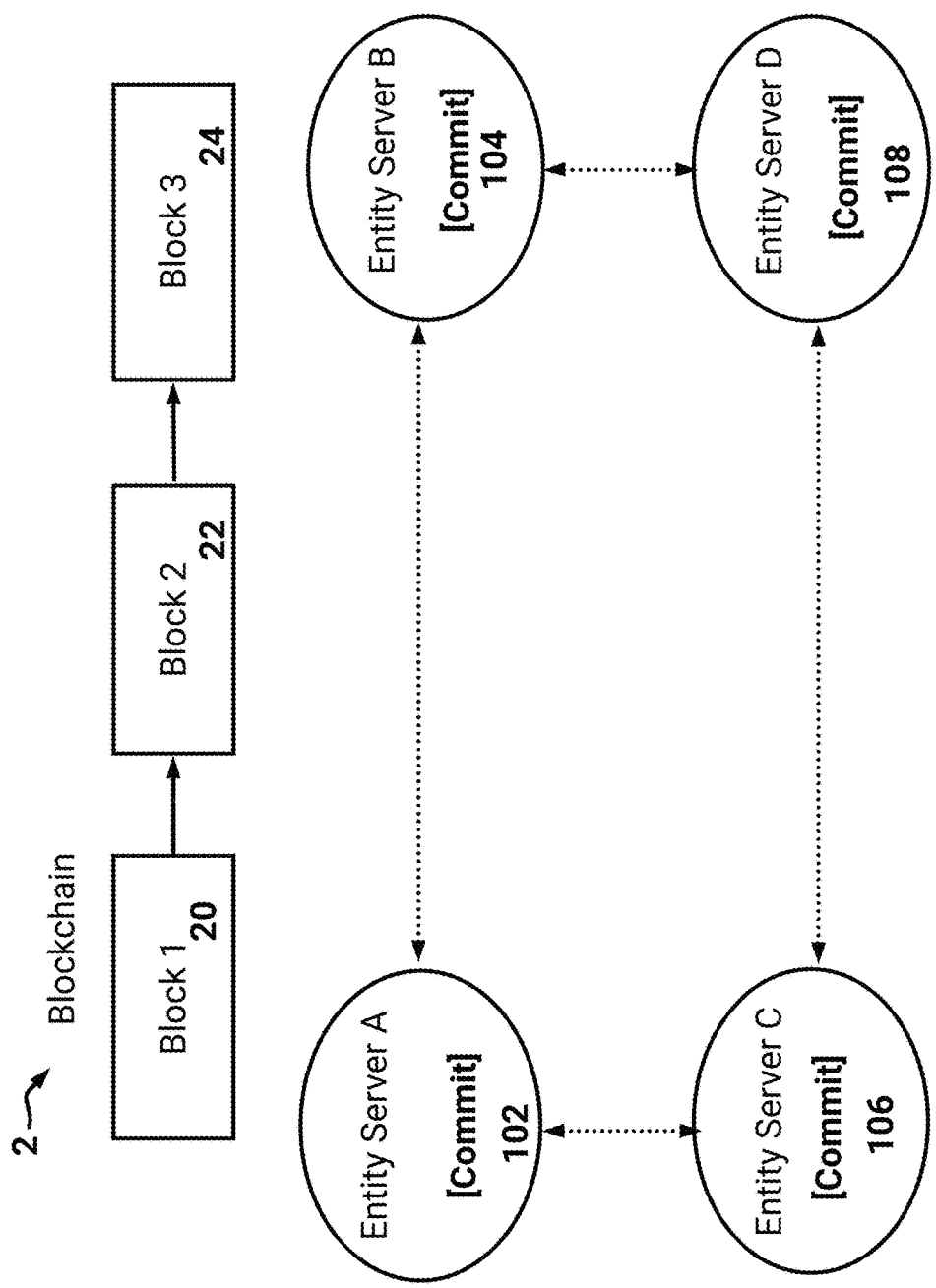
FIG. 2C illustrates a block diagram of the entity servers committing the proposed block into the blockchain.

FIG. 2C illustrates a block diagram of the entity servers 102-108 committing the proposed block into the blockchain 2. As described in FIG. 2B, the entity servers 104-108 may evaluate a block proposal 24 for inclusion in the blockchain 2. The servers 104-108 may determine their own error information associated with the ML model included in the block proposal 24. Subsequently, the servers 104-108 may compare determined error information to the error information included in the block proposal 24. Each entity server may then determine whether to commit the block proposal based on the comparison. For example, the entity servers 104-108 may consent to inclusion of the block proposal 24 if their determined error information indicates the ML model is more accurate than prior ML models included in the blockchain 2. In this example, the ML model may be required to be more accurate than all previous ML models. As another example, however, the ML model may be required to be more accurate amongst prior ML models of a same type. Optionally, the error information may have to indicate that the ML model is at least a threshold percent more accurate than prior ML models.

As illustrated in FIG. 2C, the entity servers 102-108 have consented to inclusion of the block proposal 24 into the blockchain 2 (e.g., as Block 3). Each entity server may consent via committing the block proposal. For example, the entity servers 102-108 may attach the block proposal to their respective blockchains. As described above, the entity servers 102-108 may execute software configured to function as a node of the blockchain network. Thus, each entity server may maintain a copy of the blockchain 2, and may include the block proposal. The entity servers 102-108 may identify whether the other entity servers 102-108 have committed the block proposal 24, and upon determining that a threshold number have, may cause the block 24 to be included in the blockchain 2. As an example, the entity servers 102-108 may utilize an application programming interface (API) call associated with the blockchain network 2 to request committed blocks from the other servers 102-108. The entity servers 102-108 may also broadcast whether they consent, or whether they do not consent, to inclusion of the block 24.

Thus, Block 3 may be included in the blockchain 2. The error information (e.g., generalization error) may therefore indicate that ML models related to a problem being addressed by the blockchain 2 have improved accuracy. Optionally, certain systems or users may subscribe to notifications regarding updated ML models. For example, upon a new block being included in the blockchain 2 a smart contract may cause notifications to be provided to systems or users. Notifications may include email, text, activation of an application or software on particular systems, and so on. In this way, the entity servers 102-108 may represent servers with large processing power. Users may utilize their own user devices to obtain a current state of the art in ML model, for example being automatically determined by the servers 102-108.

Figure 3A:
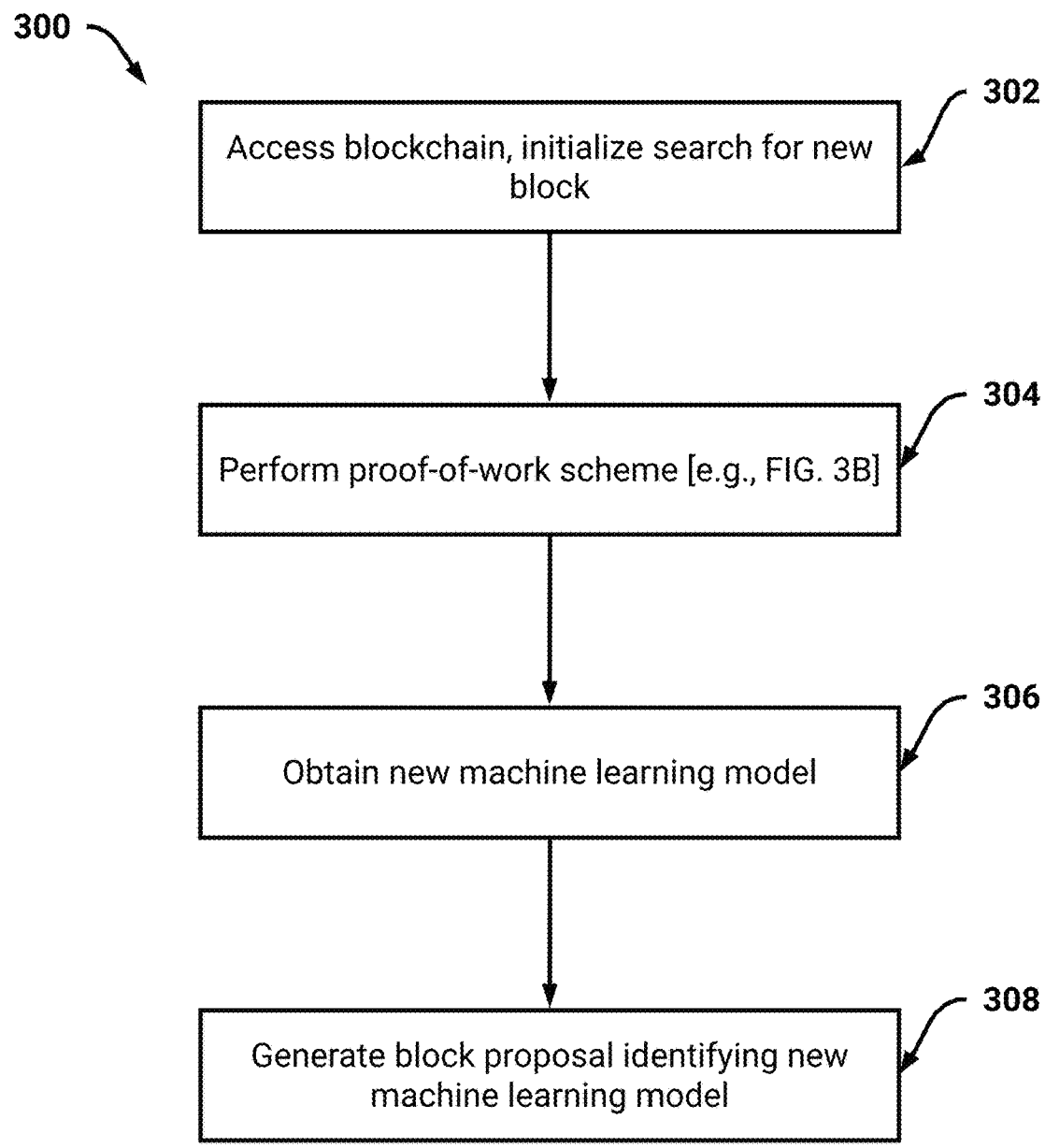
FIG. 3A illustrates a flowchart of an example process for generating a block proposal including a new machine learning (ML) model.

FIG. 3A illustrates a flowchart of an example process 300 for generating a block proposal that includes a new machine learning (ML) model. For convenience, the process 300 will be described as being performed by a system of one or more computers (e.g., an entity server, such as the entity server A 102).

At block 302, the system accesses a blockchain and initializes search for a new block. As described above, one or more blockchains may record information associated with ML models. Optionally, each blockchain may address a particular problem, or reason for utilizing an ML model. Optionally, a single blockchain may be utilized and each block of the blockchain may indicate a problem addressed by an ML model. For example, an identifier associated with the problem may be indicated.

The system may be, at least in part, controlled or under control of automated software. As part of a proof-of-work (POW) scheme utilized by the blockchain, the system may search for new blocks to include the blockchain. For example, the system may perform a scheme to mine for new blocks. To initialize the search for a new block, the system can obtain an ML model included in a current, or prior, block of the blockchain. As will be described, the system may search for a new block based on analyzing a space of ML models. Optionally, the space of ML models to search for may be based on the obtained ML model. For example, the system may utilize the parameters associated with the obtained ML model. In this example, the system may select, or otherwise identify, ranges associated with the parameters. For example, the system may select ranges associated with hyperparameters and/or model parameters as described above. The system may then search for a new ML model within a space of ML models defined, at least in part, by the ranges of parameters. As an example, the system may search for an improved neural network which has between 3 and 5 layers or between 1 and 3 pooling layers.

The system may also search for a new block by updating an ML model in a current block. As described above, successive blocks of the blockchain may include ML models which increase in accuracy (e.g., improve generalization error). Thus, the system may obtain a most recent ML model and search for a new ML model which improves upon the most recent ML model. As another example, the system may determine an ML model of a different type than the ML model included in the current block. For example, a user of the system may indicate a preference for particular ML model types.

At block 304, the system performs a POW scheme to search for a new block. As described in FIG. 2A, the system searches within a space of ML models for an improved ML model. The system may search amongst one or more types of ML models, and for each type among ranges of parameters. An example of performing the POW scheme will be described in more detail below, with respect to FIG. 3B.

At block 306, the system obtains a new ML model. Subsequent to performing the POW scheme, the system may determine a new ML model which improves accuracy (e.g., reduces generalization error). The system may then cause evaluation of this new ML model by other entities.

At block 308, the system generates a block proposal identifying the new ML model. The system packages the ML model into a new block. For example, the system may specify a type associated with the ML model along with parameters utilized by the ML model. The parameters may include features of the ML model. With respect to a neural network, example parameters may include a number of neurons, connections between the neurons, a number of layers, and so on (e.g., hyperparameters). Parameters may also include values or weights assigned to connections between neurons, particular activation functions utilized, and so on (model parameters). Optionally, the block may include information enabling access to an ML model. For example, the information may enable access to the ML model as trained by the system. Example information may include a network address, or hyperlink, to a location at which the ML model is stored. Example information may also include a hash value associated with a content-addressable file system.

The block proposal can further indicate a generalization error determined by the system for the new ML model. As will be described in FIG. 4, entities associated with the blockchain may evaluate the block proposal to ensure the indicated generalization error is accurate. The block proposal can further include information to disallow tampering with, or otherwise adjusting, the blockchain. For example, a cryptographic hash may be obtained of the blockchain and/or prior block. The cryptographic hashes may be included in the block proposal.

Figure 3B:
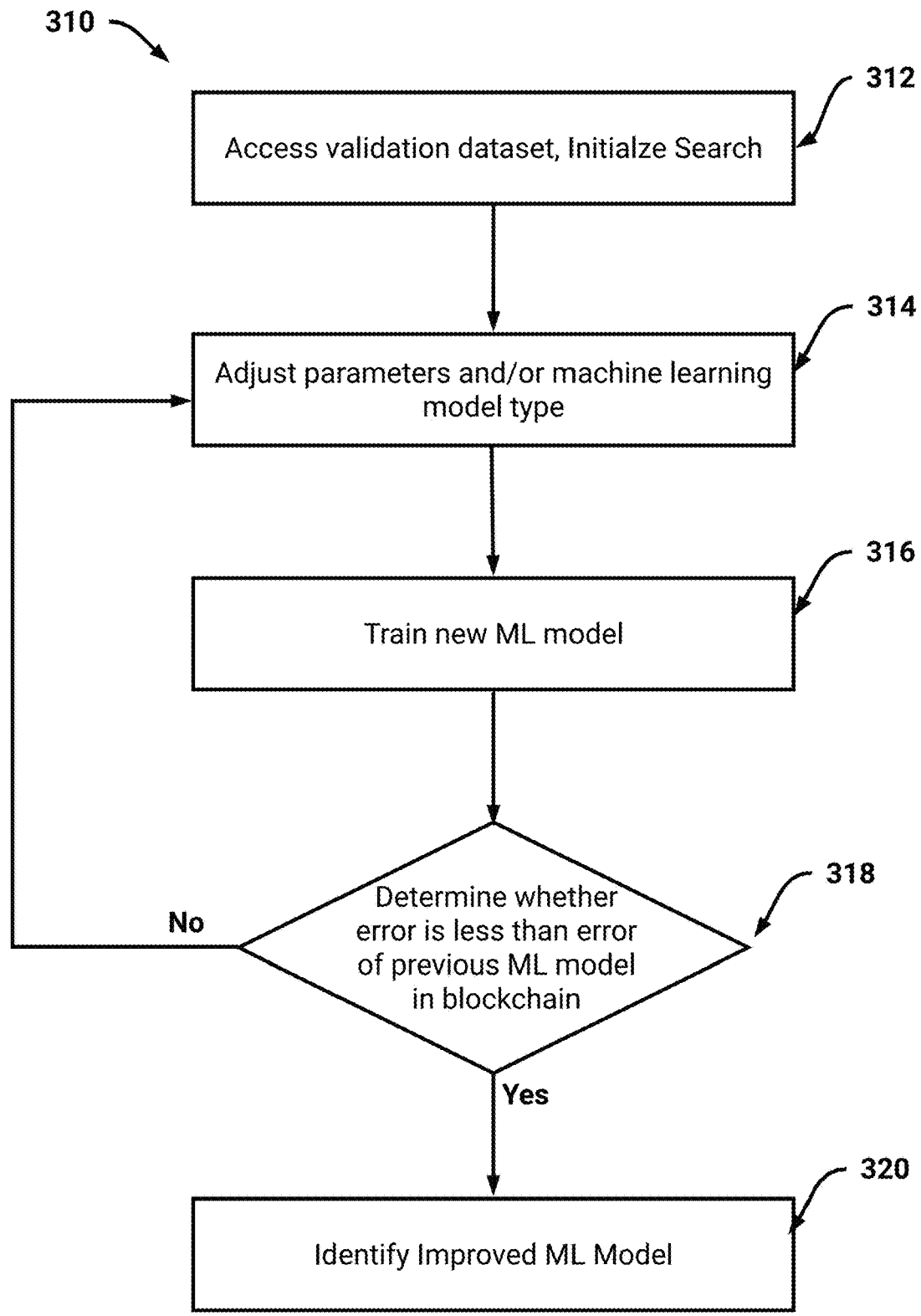
FIG. 3B illustrates a flowchart of an example process for determining the new ML model.

FIG. 3B illustrates a flowchart of an example process 310 for determining the new ML model. For convenience, the process 310 will be described as being performed by a system of one or more computers (e.g., an entity server, such as the entity server A 102).

At block 312 the system initializes the search for a new block. As described in FIG. 2A, the system may access a dataset. Optionally, the accessed dataset may be a dataset not previously analyzed by a ML model included in the blockchain. The system may thus search for a new ML model that improves generalization error, at least, for this accessed dataset. In some embodiments, the system may search for an ML model without having access to a new dataset. For example, the ML model may be determined to reduce generalization error based on analyzing previously seen datasets.

As described above, a new ML model may be an update to an existing ML model included in the blockchain. For example, the update may be an update to parameters of the existing ML model. Additionally, a new ML model may be a new ML model as compared to the ML models included in the blockchain. For example, the system may generate an ML model of a differing type than the ML models included in the blockchain.

At block 314, the system adjusts parameters and/or machine learning model type. As described in FIG. 2A, the system may search for a new ML model within a space of ML models. The space may be defined, at least in part, by the type of ML model. The space may also be defined, at least in part, by parameters associated with ML models. For example, a range of each parameter may be identified. Thus, at block 314 the system may select an initial ML model for evaluation. For example, the system may select from among the types of ML models. The system may also select parameters from within the identified ranges (e.g., select model parameters). As described above, the system may utilize the ML models included in the blockchain to select the initial ML model. As an example, the system may prefer parameters which are likely to result in an accurate ML model. In this example, the parameters may thus be similar to previously utilized parameters.

At block 316, the system trains a new ML model. The system can select an initial ML model, and then utilizing training datasets, cause the initial ML model to be trained. For example, the system may access a library (e.g., an open or closed source library) and utilize code associated with a type of the initial ML model. The system can then utilize the parameters to prepare the initial ML model for training. Based on the training datasets, the system can cause the ML model to be updated. With respect to neural networks, the ML model may be trained such that weights associated with neurons, connections between neurons, and so on, may be established.

At block 318, the system determines an error associated with the new ML model. The system then compares the determined error to prior ML models included in the blockchain. As described above, the system may determine a generalization error associated with the new ML model. If the determined error is not better than error included in blocks of the blockchain, the system may select a new ML model for evaluation. For example, the system may adjust parameters of the new ML model (e.g., within the space of ML models). As another example, the system may select a new ML model type for evaluation. Optionally, the system may enforce a particular threshold percentage reduction in error as compared to prior ML models. For example, the system may discard a new ML model if its generalization error is less than a threshold percentage better than error of prior ML models. In this example, the system may then adjust the parameters of the new ML model. For example, the system may make relatively minor adjustments to the parameters to search for a new ML model that sufficiently improves generalization error.

At block 320, if the determined error is improved then the system identifies the new ML model as being improved. As described in FIG. 3A, the system then generates a block proposal including the identified ML model.

Figure 4:
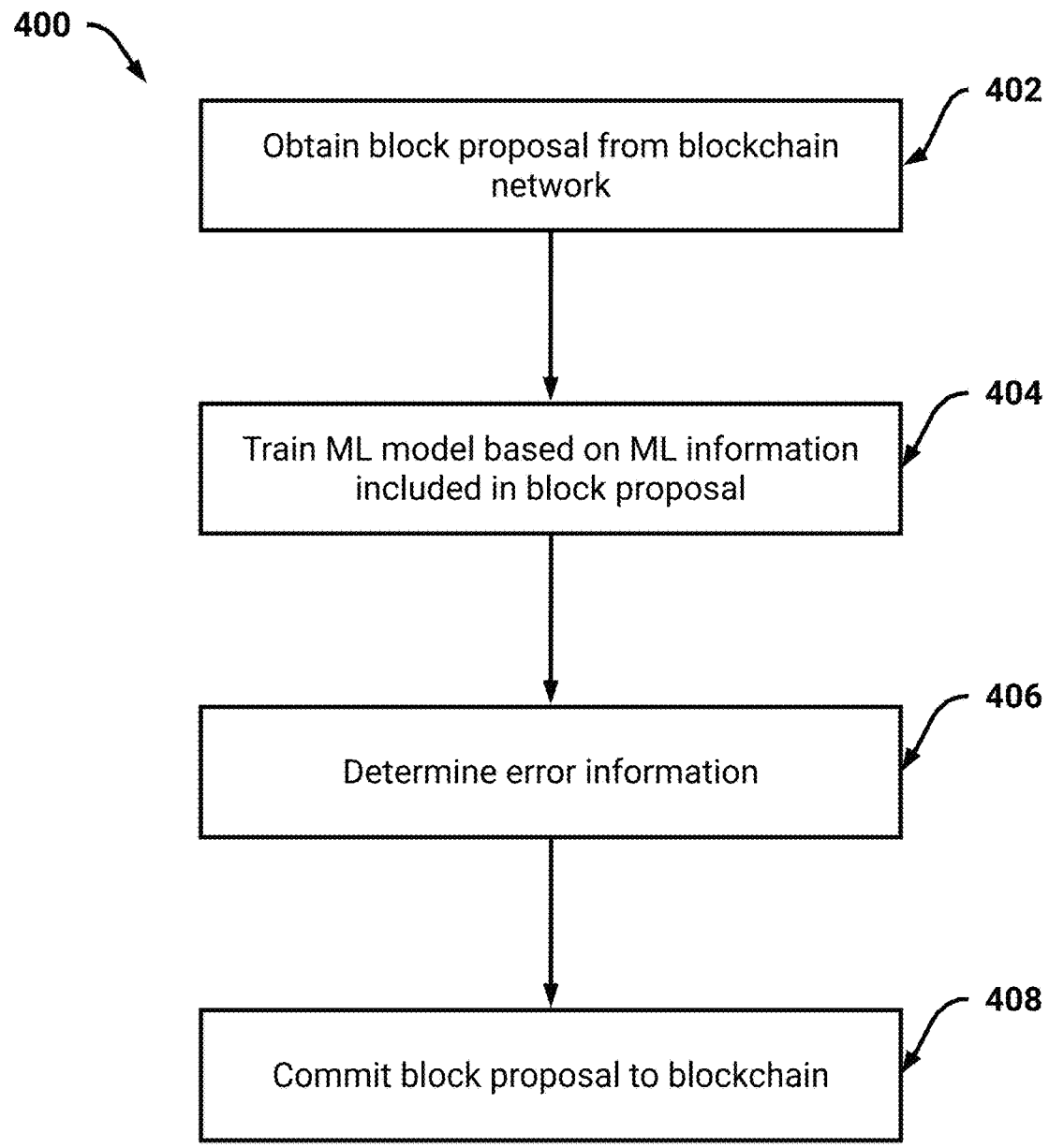
FIG. 4 illustrates a flowchart of an example process for evaluating a block proposal.

FIG. 4 illustrates a flowchart of an example process 400 for evaluating a block proposal. For convenience, the process 400 will be described as being performed by a system of one or more computers (e.g., an entity server, such as the entity server A 102).

At block 402, the system obtains a block proposal from a blockchain network. The system may execute software configured to function as a node of the blockchain network. Thus, the system can receive block proposals from peers of the blockchain network (e.g., via a TCP connection, and so on).

At block 404, the system trains a machine learning (ML) model. The block proposal, as described above, can include an ML Model. For example, the system can include a type of the ML model along with parameters of the ML model. The system may utilize the included information to generate an ML model according to the type and parameters. As an example, the system may access code libraries to obtain code associated with the type of ML model. The system may then prepare the code according to the parameters.

With the ML model, the system may utilize training datasets to train the ML model. As described above, the training datasets may be obtained from a particular source. For example, obtained from the validation dataset storage system 100, an entity who proposed the block, and so on. Additionally, the block proposal may include information enabling access to training datasets (e.g., a hash value of each training dataset). Optionally, the system may train the ML model based on training datasets that are private to the system.

At block 406, the system determines error information. For example, the system may determine one or more measures of error based on validation datasets. At block 408, the system commits the block proposal to the blockchain. If the system determines that the error information indicates a more accurate model than ML models previously included in the blockchain, the system can consent to inclusion of the block.

Figure 5:
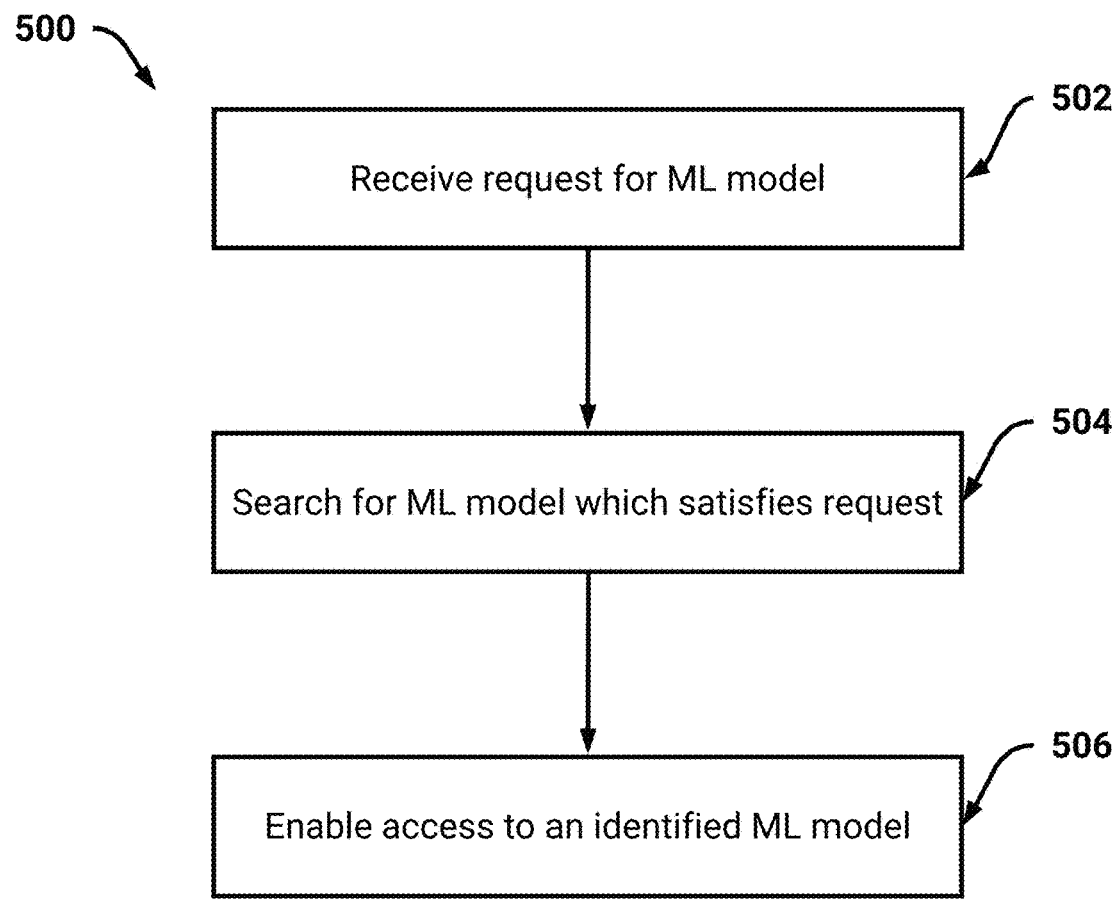
FIG. 5 illustrates an example process enabling a user to search for a published machine learning (ML) model according to the techniques described herein.

FIG. 5 illustrates an example process 500 enabling a user to search for a published machine learning (ML) model according to the techniques described herein. The process 500 may be performed by a system of one or more computers (e.g., the validation dataset storage system 100). The system may respond to requests for ML models received from user devices. Example user devices may include tablets, mobile devices, wearable devices, laptops, computers, and so on. As will be described, a user may utilize a user device to locate a particular ML model which satisfies one or more constraints. The user may then utilize the ML model on the user's user device.

At block 502, the system receives a request for an ML model along with constraints. The system may be associated with a particular content page (e.g., web page) which includes content describing available ML models. Optionally, an application executing on a user device of the user may present content associated with available ML models. For example, the content may indicate particular problems which may be addressed by use of ML models. A user may thus request an ML model which can address a specific problem. Additionally, the user may specify constraints associated with the ML model. For example, the constraints may indicate storage, memory, and/or compute requirements. As an example, a first ML model may enable superior accuracy as compared to a second ML model (e.g., improved generalization error). In this example, the first ML model may also require greater storage and/or greater processing power. Thus, a user may prefer the second ML model based on constraints associated with their user device.

A constraint may also specify performance information. For example, the user may indicate an accuracy, or generalization error, associated with a type of problem. With respect to generalization error, the user may optionally provide a dataset of their own. As an example, the user may request an ML model which can identify a user's cat with greater than a threshold accuracy. In this example, the user may provide a dataset (e.g., a video, optionally along with labels identifying the cat) to be tested against ML models included in the blockchain.

At block 504, the system searches for an ML model which satisfies the request. The system may access one or more blockchains, and identify an ML model included in a block. For example, the accessed blockchains may relate to a problem the user is addressing. The system may thus identify an ML model which provides the greatest accuracy. As an example, the system may identify a block that indicates a lowest generalization error. Optionally, each block may also indicate storage, memory, and/or compute requirements associated with an included model. An entity which proposed the block may specify these requirements, and optionally the other entities associated with the blockchain may validate them. Thus, the system may utilize these requirements to satisfy the received request. For example, the system may select an ML model which does not have the lowest generalization error to satisfy the constraints. If a block does not include processing and storage requirements, the system may estimate the requirements based on a type of the ML model and associated parameters. For example, a deep learner ML model may require greater than average processing power.

With respect to the example above regarding a user providing the user's dataset, the system may determine an error (e.g., generalization error, accuracy, and so on) with respect to the user's dataset. For example, the system may obtain ML models included in the blockchain and determine an error associated with each ML model. Optionally, the system may limit an extent to which ML models are obtained and error determined. For example, the system may obtain a threshold number of blocks, or obtain a threshold number of one or more types of ML models. The system may optionally then train the obtained ML models and determine error information. Thus, the system may present information identifying an accuracy associated with the user's dataset afforded by different ML models. The system may also present constraint information, such as processing and storage constraints. The user may then select from among the ML models.

At block 506, the system enables access to an identified ML model. Upon identification of an ML model which satisfies the request, the system may then enable access to the ML model. For example, the system may enable network access to a trained version of the ML model. In this example, the system may train, or provide network access to an already trained version of, the ML model. The system may then receive information from the user (e.g., input data), and provide outputs from the ML model. Optionally, the system may train the ML model and enable the user to download the trained model.

Additionally, the system may provide the type of ML model and parameters of the ML model. The system may then provide (e.g., as a package) training datasets to the user, optionally along with code associated with the ML model type. In this way, the user device of the user may train the ML model. In some embodiments, the user device may execute an application associated with the system. The application may enable background downloading of required information, such as training datasets, code associated with the ML model, and so on. The application may then cause training of the ML model for use by the user.

Figure 6:
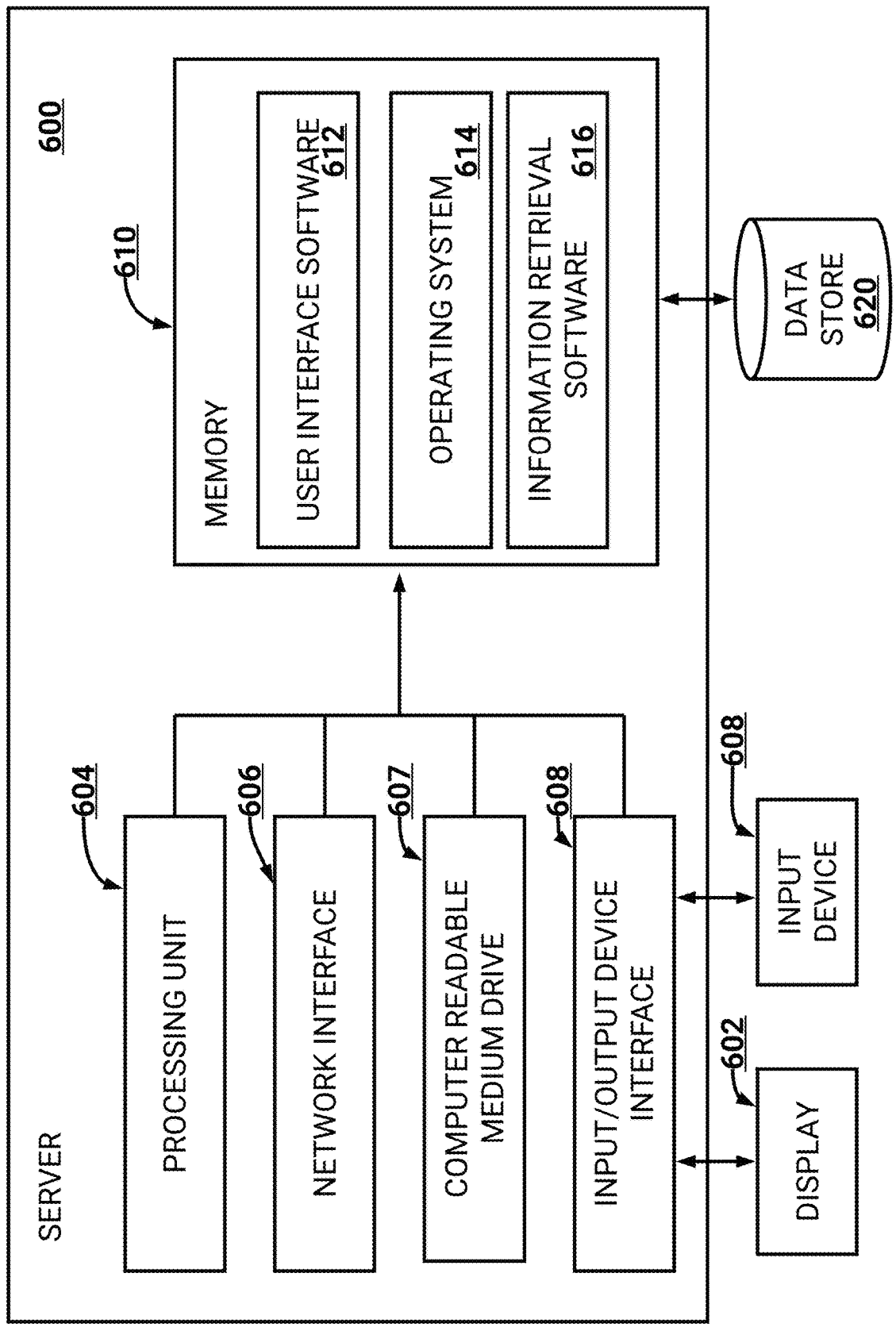
FIG. 6 is a block diagram depicting an illustrative configuration of one embodiment of a server than may implement elements of an entity server and/or the validation dataset storage system described herein.

FIG. 6 is a block diagram depicting an illustrative configuration of one embodiment of a server 600 than may implement elements of an entity server (e.g., entity server 102) and/or the validation dataset storage system 100. The general architecture of server 600 depicted in FIG. 6 includes an arrangement of computer hardware and software components that may be used to implement aspects of the present disclosure. As illustrated, the server 600 includes a processing unit 604, a network interface 606, a computer readable medium drive 607, an input/output device interface 620, a display 602, and an input device 624, all of which may communicate with one another by way of a communication bus. The network interface 606 may provide connectivity to one or more networks or computing systems, such as to one or more clients, indexing systems, data storage systems, and so on. The processing unit 604 may thus receive information and instructions from other computing systems or services via a network. The processing unit 604 may also communicate to and from memory 610 and further provide output information for an optional display 602 via the input/output device interface 620. The input/output device interface 620 may also accept input from the optional input device 624, such as a keyboard, mouse, digital pen, etc. In some embodiments, the server 600 may include more (or fewer) components than those shown in FIG. 6. For example, some embodiments of the server 600 may omit the display 602 and input device 624, while providing input/output capabilities through one or more alternative communication channel (e.g., via the network interface 606).

The memory 610 may include computer program instructions that the processing unit 604 executes in order to implement one or more embodiments. The memory 610 generally includes RAM, ROM, and/or other persistent or non-transitory memory. The memory 610 may store an operating system 614 that provides computer program instructions for use by the processing unit 604 in the general administration and operation of the server 600. The memory 610 may further include computer program instructions and other information for implementing aspects of the present disclosure. For example, in one embodiment, the memory 610 includes user interface software 612 that generates user interfaces (and/or instructions therefor) for display upon a computing device, e.g., via a navigation interface such as a web browser installed on the computing device. In addition, memory 610 may include or communicate with one or more auxiliary data stores, such as data store 620, which may correspond to any persistent or substantially persistent data storage, such as a hard drive (HDD), a solid-state drive (SDD), network attached storage (NAS), a tape drive, or any combination thereof.

In addition to the user interface module 612, the memory 610 may include information retrieval software 616 that may be executed by the processing unit 604. In one embodiment, the information retrieval software 616 implements various aspects of the present disclosure. For example, determining ML models and proposing blocks for inclusion in a blockchain. As another example, evaluating proposed blocks and committing, or not committing, the proposed blocks into the blockchain. While the information retrieval software 616 is shown in FIG. 6 as part of the server 600, in other embodiments, all or a portion of the software may be implemented by alternative computing devices, such as virtual computing devices within a hosted computing environment.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by an entity of a plurality of entities associated with a blockchain network, the method comprising:
   by an entity server of one or more computers,
      accessing a blockchain associated with the blockchain network, and obtaining a first error value specified in a block of the blockchain, the first error value being associated with a machine learning model identified in the block, wherein the blockchain records machine learning models configured to address a particular problem;
      determining a new machine learning model associated with a second error value, wherein the second error value is less than the first error value;
      generating a block proposal identifying the new machine learning model, the block proposal specifying the second error value; and
      causing transmission of the block proposal to remaining entities of the plurality of entities, wherein in response to greater than a threshold percentage of the entities approving the block proposal, causing, at least in part, inclusion of the block proposal in the blockchain.

2. The method of claim 1, wherein the first error value measures generalization error.

3. The method of claim 1, wherein determining a new machine learning model comprises:
   determining a space of machine learning models in which to search for the new machine learning model, the space specifying one or more types of machine learning models and/or parameters associated with machine learning models;
   identifying a first machine learning model within the space of machine learning models;
   determining an error value associated with the first machine learning model,
   wherein in response to the determined error value exceeding the first error value, assigning the first machine learning model as the new machine learning model.

4. The method of claim 3, wherein identifying a first machine learning model is based on parameters associated with machine learning models included in prior blocks of the blockchain.

5. The method of claim 3, wherein determining the error value comprises:
   accessing one or more training datasets, and training the first machine learning model; and
   determining the error value based on one or more validation datasets provided to the trained first machine learning model.

6. The method of claim 3, wherein in response to the determined error value being less than the first error value, the method further comprises:
   identifying a second machine learning model within the space of machine learning models, the second machine learning model being different from the first machine learning model; and
   determining an error value associated with the second machine learning model.

7. The method of claim 1, wherein the block proposal indicates a type of machine learning model associated with the new machine learning model and parameters of the new machine learning model, and wherein the remaining entities train respective machine learning models based on the block proposal.

8. The method of claim 1, wherein the remaining entities validate the second error value, and wherein the remaining entities commit the block proposal to the blockchain based on the validation.

9. A system comprising one or more computers and computer storage media storing instructions that, when executed by the one or more computers, cause the system to perform operations comprising:
   accessing a blockchain associated with a blockchain network, and obtaining a first error value specified in a block of the blockchain, the first error value being associated with a machine learning model identified in the block, wherein the blockchain records machine learning models configured to address a particular problem;
   determining a new machine learning model associated with a second error value, wherein the second error value is less than the first error value;
   generating a block proposal identifying the new machine learning model, the block proposal specifying the first error value; and
   causing transmission of the block proposal to a plurality of entities, wherein in response to greater than a threshold percentage of the entities approving the block proposal, causing, at least in part, inclusion of the block proposal in the blockchain.

10. The system of claim 9, wherein the first error value represents a generalization error.

11. The system of claim 9, wherein determining a new machine learning model comprises:
   determining a space of machine learning models in which to search for the new machine learning model, the space specifying one or more types of machine learning models and/or parameters associated with machine learning models;
   identifying a first machine learning model within the space of machine learning models;
   determining an error value associated with the first machine learning model,
   wherein in response to the determined error value exceeding the first error value, assigning the first machine learning model as the new machine learning model.

12. The system of claim 11, wherein identifying a first machine learning model is based on parameters associated with machine learning models included in prior blocks of the blockchain.

13. The system of claim 11, wherein determining the error value comprises:
   accessing one or more training datasets, and training the first machine learning model; and
   determining the error value based on one or more validation datasets provided to the trained first machine learning model.

14. The system of claim 11, wherein in response to the determined error value being less than the first error value, the operations further comprise:
- identifying a second machine learning model within the space of machine learning models; and
- determining an error value associated with the second machine learning model.

15. The system of claim 9, wherein the block proposal indicates a type of new machine learning model and parameters of the machine learning model, and wherein the entities train respective machine learning models based on the block proposal.

16. The system of claim 9, wherein the entities validate the second error value, and wherein the entities commit the block proposal to the blockchain based on the validation.

17. A method implemented by a first entity of a plurality of entities associated with a blockchain of a blockchain network, the method comprising:
- by an entity server of one or more computers,
  - obtaining a block proposal from a second entity of the plurality of entities, the block proposal including information regarding a first machine learning model, the information regarding the first machine learning model including a type of machine learning model associated with the first machine learning model, one or more parameters associated with the first machine learning model, and a first error value associated with the first machine learning model, wherein the blocks of the blockchain record machine learning models;
  - generating the first machine learning model according to the information included in the block proposal;
  - determining an error value associated with the first machine learning model; and
  - in response to the error value being within a threshold of the first error value identified in the block proposal, committing the block proposal to the blockchain.

18. The method of claim 17, wherein generating the first machine learning model comprises:
- accessing a code library, and obtaining code associated with the type of machine learning model; and
- training the first machine learning model based on one or more training datasets, the first machine learning model being trained utilizing the obtained code adjusted according to the one or more parameters.

19. The method of claim 18, wherein determining the error value comprises:
- accessing one or more validation datasets, and analyzing the validation datasets via the trained first machine learning model; and
- determining the error value based, at least in part, on an accuracy associated with analyzing the validation datasets.

* * * * *